UNITED STATES PATENT OFFICE.

CARL THUN, OF ELBERFELD, AND PAUL TUST AND PAUL THOMASCHEWSKI, OF VOHWINKEL, NEAR ELBERFELD, GERMANY, ASSIGNORS TO SYNTHETIC PATENTS CO., INC., OF NEW YORK, N. Y., A CORPORATION OF NEW YORK.

RED ALUMINA COLOR-LAKE.

1,090,352. Specification of Letters Patent. Patented Mar. 17, 1914.

No Drawing. Application filed July 15, 1913. Serial No. 779,125.

*To all whom it may concern:*

Be it known that we, CARL THUN, PAUL TUST, and PAUL THOMASCHEWSKI, doctors of philosophy, chemists, citizens of the German Empire, residing at, respectively, Elberfeld, Vohwinkel, and Vohwinkel, near Elberfeld, Germany, have invented new and useful Improvements in Red Alumina Color-Lakes, of which the following is a specification.

We have found the purpurin sulfonic acids having most probably the formula:

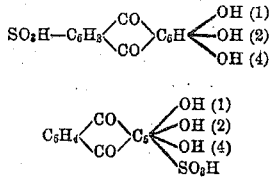

or

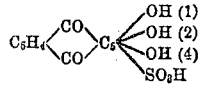

yield valuable pigments or lakes when treated with alumina as substratum. The new lakes have a valuable clear bluish-red shade and are fast to light.

In order to illustrate the new process more fully the following examples are given, the parts being by weight:

Example 1: 100 parts of aluminium sulfate (10 per cent. $Al_2O_3$) and 1.25 parts of 1.2.4-trioxyanthraquinone-3-sulfonic acid having the formula:

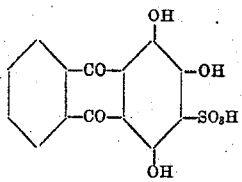

are dissolved in 1000 parts of hot water and the lake is precipitated with a solution of 30 parts of calcined sodium carbonate in 300 parts of water. The lake is filtered off, washed, dried and ground.

Example 2: 1.25 parts of 1.2.4-trioxyanthraquinone-3-sulfonic acid are dissolved in water heated to boiling with 60 parts of alumina hydrate in paste (10 per cent. $Al_2(OH)_6$). The lake is then filtered off, washed, dried and ground.

Any other method for producing pigments or lakes can be used.

We claim:—

1. The new red alumina color lakes prepared from purpurin sulfonic acids and containing aluminum, said lakes being distinguished by their valuable bluish-red shade and their fastness to light, substantially as described.

2. The new red alumina color lake prepared from 1.2.4-trioxyanthraquinone-3-sulfonic acid and containing aluminum, said lake being distinguished by its valuable bluish-red shades and its fastness to light, substantially as described.

In testimony whereof we have hereunto set our hands in the presence of two subscribing witnesses.

CARL THUN. [L. S.]
    PAUL TUST. [L. S.]
    PAUL THOMASCHEWSKI. [L. S.]

Witnesses:
    HELEN NUFER,
    ALBERT NUFER.